United States Patent
Dunjic et al.

(10) Patent No.: US 11,108,762 B2
(45) Date of Patent: Aug. 31, 2021

(54) METHODS AND SYSTEMS FOR CONTROLLING ACCESS TO A PROTECTED RESOURCE

(71) Applicant: The Toronto-Dominion Bank, Toronto (CA)

(72) Inventors: Milos Dunjic, Oakville (CA); Anthony Haituyen Nguyen, Toronto (CA); Yubing Liu, Toronto (CA); Arthur Carroll Chow, Markham (CA); Casey Lyn Doyle, Ajax (CA); Richard John Frederick Thake, Cobourg (CA); Mengfei Wang, Toronto (CA); Aaron Ashish Hudali, Cambridge (CA); Gregory Albert Kliewer, Barrie (CA); Martin Albert Lozon, London (CA); Yusbel Garcia Diaz, Toronto (CA); Gareth Daly, Toronto (CA); Masashi Kobayashi, Toronto (CA); Randall John Bast, Oakville (CA)

(73) Assignee: The Toronto-Dominion Bank, Toronto (CA)

(*) Notice: Subject to any disclaimer, the term of this patent is extended or adjusted under 35 U.S.C. 154(b) by 237 days.

(21) Appl. No.: 16/282,678

(22) Filed: Feb. 22, 2019

(65) Prior Publication Data

US 2019/0372958 A1   Dec. 5, 2019

Related U.S. Application Data

(63) Continuation-in-part of application No. 16/038,640, filed on Jul. 18, 2018, which is a continuation-in-part
(Continued)

(51) Int. Cl.
| | | |
|---|---|---|
| *H04L 29/06* | (2006.01) | |
| *H04L 9/08* | (2006.01) | |
| *H04L 9/32* | (2006.01) | |

(52) U.S. Cl.
CPC ........ *H04L 63/0807* (2013.01); *H04L 9/0825* (2013.01); *H04L 9/0891* (2013.01); *H04L 9/3213* (2013.01); *H04L 9/3247* (2013.01)

(58) Field of Classification Search
CPC ... H04L 63/0807; H04L 63/10; H04L 9/0825; H04L 9/0891; H04L 9/3213; H04L 9/3247; H04W 12/0804
See application file for complete search history.

(56) References Cited

U.S. PATENT DOCUMENTS

| | | | | |
|---|---|---|---|---|
| 6,453,353 B1* | 9/2002 | Win | ............. | G06F 21/604 709/225 |
| 9,160,731 B2* | 10/2015 | Chang | ............. | H04L 63/0428 |

(Continued)

FOREIGN PATENT DOCUMENTS

WO   WO16130739   8/2016

OTHER PUBLICATIONS

EGovWatch: Mobile app launched on Mansa Devi Temple, Date of Publication: Mar 22, 2015, http://computer.expressbpd.com/egov-watch/egovwatch-mobile-applaunched-on-mansa-devi-temple/10769/.

*Primary Examiner* — Sarah Su
(74) *Attorney, Agent, or Firm* — Rowand LLP

(57) ABSTRACT

A method for regulating access to a protected resource is disclosed. The method includes: receiving, via the communication interface from a client application executing on a first device, a first signal including a request to obtain an access token for accessing a protected resource, the request including: a client identifier uniquely identifying the client application; an authorization code for authorizing the client
(Continued)

application's access of the protected resource; and a public key associated with the end user; and in response to validating the request: encrypting the authorization code using the public key to generate a first code; and transmitting, via the communication interface to the client application on the first device, a second signal including both an access token for accessing the protected resource and the first code.

20 Claims, 8 Drawing Sheets

Related U.S. Application Data of application No. 16/000,086, filed on Jun. 5, 2018, now Pat. No. 10,834,096.

(56) References Cited

U.S. PATENT DOCUMENTS

| | | | |
|---|---|---|---|
| 9,792,782 B1 | 10/2017 | Basu et al. | |
| 10,089,610 B2 | 10/2018 | Chow et al. | |
| 10,552,831 B2 | 2/2020 | Barnett et al. | |
| 10,666,657 B1* | 5/2020 | Threlkeld | H04L 63/20 |
| 10,715,514 B1* | 7/2020 | Threlkeld | H04L 63/107 |
| 2008/0095373 A1* | 4/2008 | Nagata | H04L 63/10 |
| | | | 380/278 |
| 2008/0263650 A1* | 10/2008 | Kerschbaum | G06F 21/6218 |
| | | | 726/9 |
| 2012/0191611 A1 | 7/2012 | Kelly et al. | |
| 2012/0191613 A1 | 7/2012 | Forbes et al. | |
| 2013/0273843 A1 | 10/2013 | Shimota et al. | |
| 2014/0006135 A1 | 1/2014 | Vergun et al. | |
| 2014/0149287 A1 | 5/2014 | Mafolasire | |
| 2014/0229397 A1 | 8/2014 | Fink | |
| 2014/0281506 A1* | 9/2014 | Redberg | H04L 63/0272 |
| | | | 713/159 |
| 2015/0149530 A1* | 5/2015 | Maret | H04L 67/2814 |
| | | | 709/203 |
| 2015/0150109 A1* | 5/2015 | Bocanegra | H04L 63/0807 |
| | | | 726/9 |
| 2015/0324789 A1* | 11/2015 | Dvorak | H04W 12/06 |
| | | | 705/67 |
| 2016/0027032 A1 | 1/2016 | Yip et al. | |
| 2016/0232010 A1* | 8/2016 | Dicks | G06F 8/654 |
| 2016/0343043 A1 | 11/2016 | Hicks | |
| 2017/0085563 A1* | 3/2017 | Royyuru | G06Q 20/3223 |
| 2017/0142108 A1* | 5/2017 | Zhang | H04L 63/0823 |
| 2017/0195457 A1* | 7/2017 | Smith, II | H04L 63/166 |
| 2017/0308883 A1* | 10/2017 | Black | G06Q 20/206 |
| 2018/0082283 A1 | 3/2018 | Sharma | |
| 2018/0114030 A1* | 4/2018 | Sullivan | H04L 9/3226 |
| 2018/0176203 A1 | 6/2018 | Wang | |
| 2018/0234464 A1* | 8/2018 | Sim | H04L 9/3213 |
| 2019/0028478 A1* | 1/2019 | Love | H04L 9/3226 |
| 2019/0081943 A1* | 3/2019 | Yamanakajima | H04L 63/0815 |
| 2019/0325129 A1 | 10/2019 | Wang et al. | |
| 2019/0332808 A1* | 10/2019 | Dunjic | H04L 63/08 |
| 2019/0349360 A1* | 11/2019 | Yeddula | H04L 63/0807 |
| 2019/0372958 A1 | 12/2019 | Dunjic et al. | |
| 2019/0372993 A1 | 12/2019 | Dunjic et al. | |
| 2019/0394041 A1* | 12/2019 | Jain | H04L 63/10 |
| 2020/0084037 A1* | 3/2020 | Zhang | H04L 9/085 |
| 2020/0097937 A1* | 3/2020 | Dunjic | G06Q 20/3821 |

* cited by examiner

METHODS AND SYSTEMS FOR CONTROLLING ACCESS TO A PROTECTED RESOURCE

CROSS-REFERENCE TO RELATED APPLICATIONS

The present application is a continuation-in-part of U.S. patent application Ser. No. 16/038,640 filed on Jul. 18, 2018, which is a continuation-in-part of U.S. patent application Ser. No. 16/000,086 filed on Jun. 5, 2018, the contents of which are hereby incorporated by reference.

TECHNICAL FIELD

The present disclosure relates to security of data systems and, in particular, to systems that are designed to perform user authentication and authorization for accessing protected data sources.

BACKGROUND

Identity and access management (IAM) systems enable user authentication and authorization across autonomous security domains. Modern IAM solutions implement open industry standards (e.g. OpenID, OAuth 2.0) to achieve interoperability for common access control processes, such as single sign-on (SSO) and cross-domain account provisioning. In particular, IAM solutions facilitate portability of identity information to enable users of one domain to access data or systems of another otherwise independent domain.

Third-party applications, such as web or mobile applications, may interface with IAM systems when attempting to access a protected resource. For example, a client application executing on a user's mobile device may, upon receiving permission from the user, request to access the user's resources (e.g. data, services) at a resource server. The client application may, for example, request to directly access user content at the resource server, or generate an application programming interface (API) call requesting an operation to be performed at the resource server. An IAM implementation may perform authentication of such client applications. It would be desirable for IAM systems and platforms to enable secure authentication of client applications for accessing protected resources, without the need for redundant user administration.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
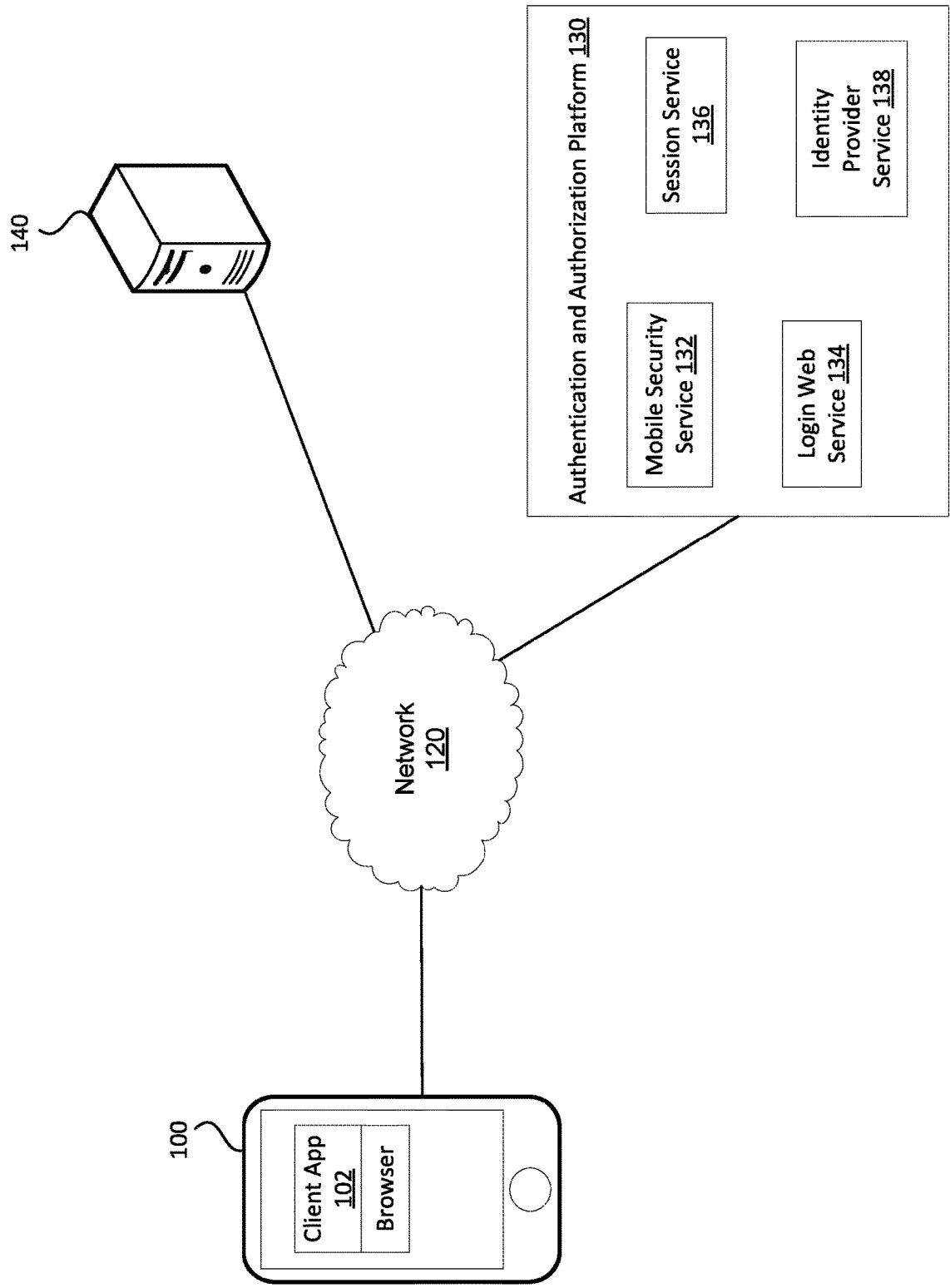
FIG. 1 is a schematic diagram illustrating an operating environment of an example embodiment.

In one aspect, the present disclosure describes a network device. The network devices includes: a communication interface connected to an external network; a memory; a processing unit coupled to the communication interface and the memory, the processing unit being configured to: receive, via the communication interface from a client application executing on a first device, a first signal including a request to obtain an access token for accessing a protected resource, the request including: a client identifier uniquely identifying the client application; an authorization code for authorizing the client application's access of the protected resource; and a public key associated with the end user; and in response to validating the request: encrypt the authorization code using the public key to generate a first code; and transmit, via the communication interface to the client application on the first device, a second signal including both an access token for accessing the protected resource and the first code.

In some implementations, the authorization code may be a unique code encoding authentication of an end-user of the client application.

In some implementations, the processing unit may be further configured to: receive, via the communication interface from the client application, a third signal including an indication that decrypting the first code failed to produce a match of the authorization code; and in response to receiving the third signal, revoking the access token at a token revocation endpoint of the network device.

In some implementations, the processing unit may be further configured to: receive, via the communication interface from a web server associated with the protected resource, a fourth signal including a request to validate a bearer token submitted by the client application to the web server, the bearer token including a digital signature; validate the bearer token, the validating including verifying the digital signature using the public key; and in response to validating the bearer token, send to the web server via the communication interface a fifth signal including a notification that the bearer token is valid.

In some implementations, the bearer token may include a cryptographic nonce.

In some implementations, the digital signature may be generated based on a message that includes a combination of a first representation of the access token and the cryptographic nonce.

In some implementations, the digital signature may be generated using a private key corresponding to the public key, the private key being stored in a hardware-based key manager that is isolated from the processor.

In some implementations, the digital signature may be generated in the hardware-based key manager.

In some implementations, the access token may have an associated expiry period and wherein the processor is further configured to store the nonce in the memory for duration of the expiry period of the access token.

In some implementations, sending the fourth signal to the web server may comprise generating a message and signing the generated message using a first private key.

In another aspect, the present disclosure describes a method of regulating access to a protected resource. The method includes: receiving, via the communication interface from a client application executing on a first device, a first signal including a request to obtain an access token for accessing a protected resource, the request including: a client identifier uniquely identifying the client application; an authorization code for authorizing the client application's access of the protected resource; and a public key associated with the end user; and in response to validating the request: encrypting the authorization code using the public key to generate a first code; and transmitting, via the communication interface to the client application on the first device, a second signal including both an access token for accessing the protected resource and the first code.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In an aspect, the present application discloses a software architecture for an authentication and authorization platform. More specifically, a platform for client authentication and authorization of access to a protected resource is disclosed. The platform of the present disclosure may include a mobile security service designed to promote secure authentication of client applications and verification of access permissions. The mobile security service may, for example, be implemented as an authorization server that functions as an intermediary between client applications and a protected resource.

The present application also describes methods and systems enabling transfer of data between accounts at a resource server. The system may be built on top of a back-end structure that is provided by the authentication and authorization platform disclosed herein. The system may facilitate enhanced security by requiring multiple layers of authentication between client applications and the resource server and by preserving the anonymity of sensitive account information that may be appropriated by a malicious attacker.

Reference is first made to FIG. 1, which shows an exemplary operating environment in accordance with embodiments of the present disclosure. FIG. 1 illustrates an exemplary system for authenticating clients and granting authorization to access a protected resource 140.

The electronic device 100 is a computer system. In some embodiments, the electronic device 100 may be a portable electronic device. For example, the electronic device 100 may, as illustrated, be a smartphone. The electronic device 100 may be a computing device of another type such as a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments. In some embodiments, the electronic device 100 may include a smart card, chip card, integrated circuit card (ICC), and/or other card having an embedded integrated circuit.

The electronic device 100 is configured to execute software, such as client application 102 and web browsers. A client application 102 may, for example, be a web application (e.g. single-page application, or SPA), a mobile application, or a desktop application. The client application 102 may be an app that requests to access a protected resource 140. In at least some embodiments, the client application 102 may request a third-party service to perform authentication on its behalf. For example, the client application 102 may have a credential that must be authenticated for the client application 102 to be granted permission to access the protected resource 140. The client application 102 has an identifier uniquely identifying the client application 102.

The network 120 is a computer network. The network 120 allows computer systems in communication therewith to communicate. For example, as illustrated, the network 120 may allow the electronic device 100 to communicate with the authentication and authorization platform 130 and the protected resource 140.

The protected resource 140 is accessible via the network 120. The protected resource 140 may be a computer system that includes one or more database servers, computer servers, and the like. In some embodiments, the protected resource 140 may be an application programming interface (API) for a web-based system, operating system, database system, computer hardware, or software library.

The authentication and authorization platform 130 is a computer system. The platform 130 may include one or more computing devices such as, for example, database servers, computer servers, and the like. The computing devices may be in communication with each other using the network 120. Alternatively, the computing devices may communicate using another network such as, for example, a local-area network (LAN). In some embodiments, the platform 130 may include multiple computing devices organized in a tiered arrangement. For example, platform 130 may include middle-tier and back-end computing devices. In some embodiments, platform 130 may be a cluster formed of a plurality of interoperating computing devices.

The authentication and authorization platform 130 may handle a wide range of services relating to user/client authentication, user sessions management, and authorization. FIG. 1 illustrates a plurality of defined services that are included as part of the authentication and authorization platform 130: mobile security service 132, login web service 134, user session service 136, and identity provider service 138. Each of these services may be rendered by independent computer systems, or alternatively, one or more of the services may be implemented by the same computer system. Furthermore, one or more of the services may be performed or offered together in the authentication and authorization platform 130.

The login web service 134 provides authentication verification. Specifically, the login web service 134 may authenticate a user of the electronic device 100 based on verifying user and/or client credentials received from the electronic device 100. The login web service 134 may enforce multi-factor authentication policies (if the user has not already been authenticated), and may maintain a record of authenticated users.

The user session service 136 is responsible for handling tasks relating to user sessions, including, among others, user attributes processing, token revocation, and session revocation. In particular, the session service 136 may, for example, provide an endpoint each for: retrieving user attributes; revoking "tokens" or security credentials; and revoking user sessions.

The identity provider service 138 provides a security token service (STS). An STS handles issuing, validating, renewing, and cancelling security tokens. A token issued by the STS can then be used to identify the holder of the token to services requiring standards-based authentication. In some embodiments, the identity provider service 138 may comply with the specification of the OpenID Connect standard, an authentication layer on top of the OAuth 2.0 authorization framework. The identity provider service 138 includes an authorization endpoint where an end-user is asked to authenticate and grant a client application access to the user's identity. In OAuth 2.0 implementations, a token endpoint of the identity provider service 138 may perform verification of a code challenge when exchanging an authorization code for a set of one or more security tokens.

The mobile security service 132 provides an endpoint each for: exchanging authorization code for a set of security tokens; providing verification of access/bearer tokens; and retrieving refresh tokens and new access tokens. Accordingly, the mobile security service 132 may be connected to at least one of a security token service (or an implementation thereof), a client application, and a protected resource (or a server associated therewith).

Other services may be provided by the authentication and authorization platform 130. For example, an authentication orchestrator service (not shown) may enforce the protocols for obtaining security tokens, and provide endpoints for client information retrieval, client registration, and session validation. A user information service (not shown) may gather user attributes from various different sources to build a unique view of user information, and ensure that user attributes are maintained up-to-date.

Figure 2:
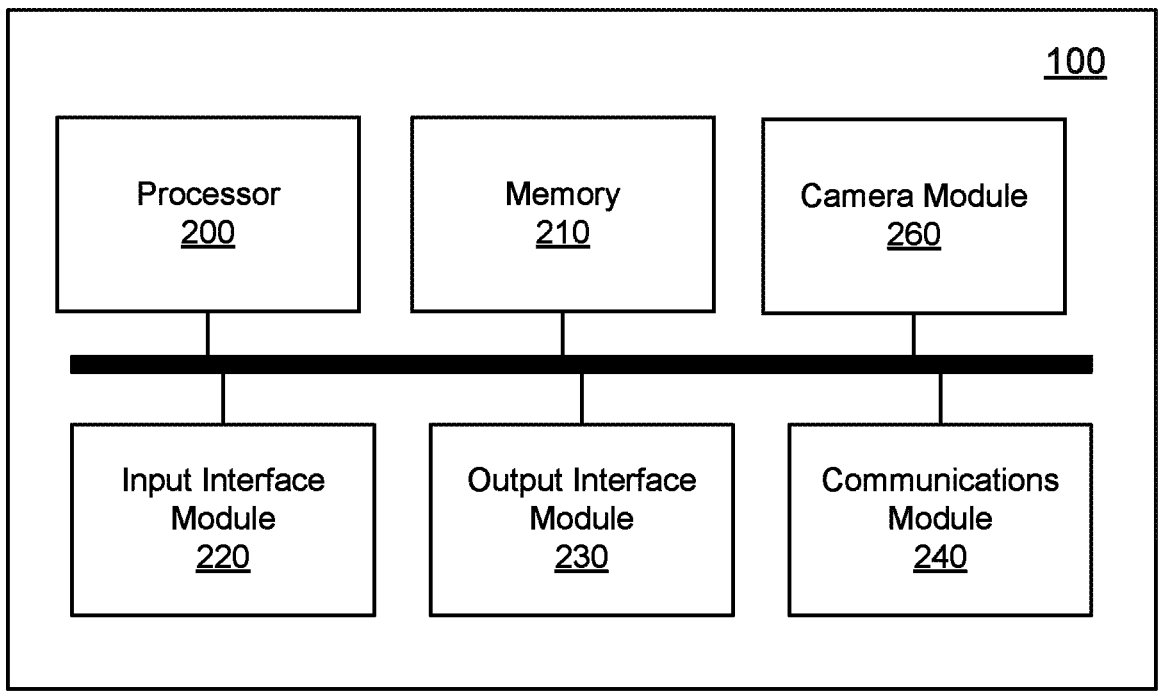
FIG. 2 is a high-level operation diagram of an example electronic device.

Returning to the electronic device 100, FIG. 2 is a high-level operation diagram of the example electronic device 100. As will be discussed in greater detail below, the electronic device 100 includes a data transfer application that allows a user to request the transfer of data between accounts at a resource server.

The electronic device 100, a computing device, includes a variety of modules. For example, as illustrated, the electronic device 100, may include a processor 200, a memory 210, an input interface module 220, an output interface module 230, a communications module 240, and a camera module 260. As illustrated, the foregoing example modules of the electronic device 100 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the electronic device 100.

The input interface module 220 allows the electronic device 100 to receive input signals. Input signals may, for example, correspond to input received from a user. The input interface module 220 may serve to interconnect the electronic device 100 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the electronic device 100 to provide output signals. Some output signals may, for example allow provision of output to a user. The output interface module 230 may serve to interconnect the electronic device 100 with one or more output devices. Output signals may be sent to output devices by output interface module 230. Output devices may include, for example, a display screen such as, for example, a liquid crystal display (LCD), a touchscreen display. Additionally or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the electronic device 100 to communicate with other electronic devices and/or various communications networks. For example, the communications module 240 may allow the electronic device 100 to send or receive communications signals. Communications signals may be sent or received according to one or more protocols or according to one or more standards. For example, the communications module 240 may allow the electronic device 100 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 240 may allow the electronic device 100 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the electronic device 100. For example, the communications module may be integrated into a communications chipset.

The camera module 260 allows the electronic device 100 to capture camera data such as images in the form of still photographs and/or motion video. The camera module 260 includes one or more cameras that are mounted on the electronic device 100. In particular, the electronic device 100 may include a display screen on a first side and at least one rear-facing camera on a second side opposite to the first side. The rear-facing cameras are located to obtain images of a subject near a rear side of the electronic device 100. The camera data may be captured in the form of an electronic signal which is produced by an image sensor associated with each of one or more of the cameras. In at least some embodiments, the electronic device 100 operates in an operating mode in which the display screen acts as a viewfinder displaying image data associated with the rear-facing cameras.

Software comprising instructions is executed by the processor 200 from a computer-readable medium. For example, software may be loaded into random-access memory from persistent storage of memory 210. Additionally or alternatively, instructions may be executed by the processor 200 directly from read-only memory of memory 210.

Figure 3:
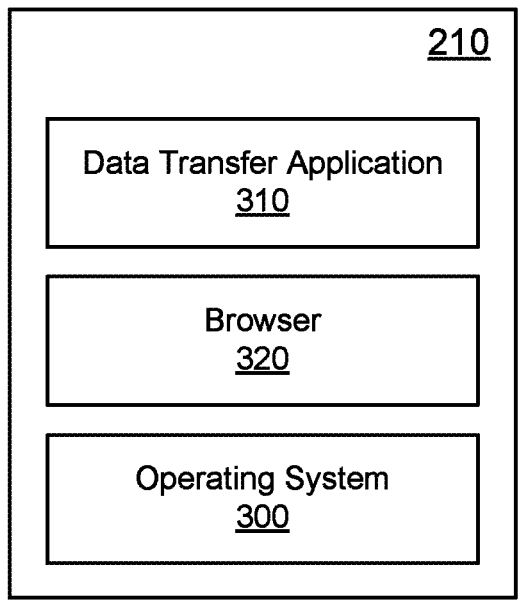
FIG. 3 depicts a simplified software organization of the example electronic device of FIG. 2.

FIG. 3 depicts a simplified organization of software components stored in memory 210 of the electronic device 100. As illustrated these software components include an operating system 300 and a data transfer application 310.

The operating system 300 is software. The operating system 300 allows the data transfer application 310 to access the processor 200, the memory 210, the input interface module 220, the output interface module 230 and the communications module 240. The operating system 300 may be, for example, Apple iOS™, Google™ Android™, Linux™, Microsoft™ Windows™, or the like.

The data transfer application 310 adapts the electronic device 100, in combination with the operating system 300, to operate as a device capable of requesting transfer of data between user accounts at a resource server. The data transfer application 310 may be a stand-alone application or integrated into another application as a sub-function or feature. For example, the data transfer application 310 may be called as a sub-function by a mobile application that is used for making cheque deposits and/or data transfers corresponding to financial data. In particular, the data transfer application 310 may be part of a banking application or a similar application suited for requesting transfers between accounts on servers of bank institutions. The data transfer application 310 may offer, as a feature, the ability to request transfers between various bank accounts (e.g. chequing account, savings account, etc.). In order to effect such data transfers, a mobile banking application may call the data transfer application 310 when prompted by a user input to initiate a transfer process.

The data transfer application 310 may include one or more submodules.

Figure 4:
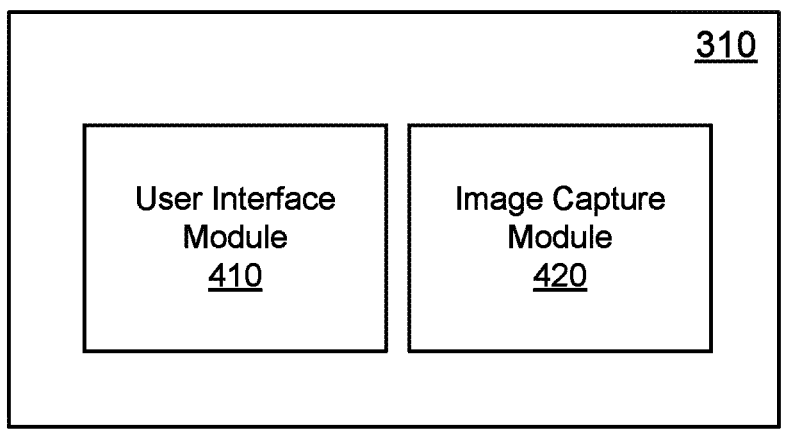
FIG. 4 depicts a simplified organization of software modules exemplary of an embodiment of a data transfer application.

FIG. 4 depicts a simplified organization of submodules exemplary of an embodiment of the data transfer application 310.

As illustrated, the data transfer application 310 includes a user interface module 410 and an image capture module 420.

The user interface module 410 provides a user interface for the data transfer application 310. In some embodiments, the provided user interface may be visual and may include one or more screens or panels allowing a user to configure and control various aspects of the data transfer application 310 and to otherwise review other information related to aspects of the data transfer application 310. For example, a visual user interface may be provided using a display screen accessed via the output interface module 230 (FIG. 2). The user interface for the data transfer application 310 may be provided as a viewfinder or a preview screen on the display screen of the electronic device 100. More specifically, when the data transfer application 310 is launched, at least a portion of the display screen of the electronic device 100 may be occupied by a viewfinder or a preview screen which shows a live preview of a scene as captured by the camera module 260 of the electronic device 100.

The user interface module 410 may process input provided by a user such as may be received, for example, via the input interface module 220 (FIG. 2). For example, a user may provide input for processing by the user interface module 410 using an input device such as, for example, a touch display screen from which input is received. The input from the input device may be received via the input interface module 220.

Additionally or alternatively, the user interface module 410 may provide one or more other forms of user interface such as, for example, an audio-based interface which uses text-to-speech or voice recognition to interact with a user.

The image capture module 420 is responsible for initiating and controlling the capture and processing of images which may be performed as a sub-function of the data transfer application 310. The image capture module 420 may be configurable to support capturing and processing images of various different types of documents. For example, the image capture module 420 may support capturing images of documents containing printed material thereon (e.g. identity documents, financial instruments, tickets, receipts) as well as documents/pages that are displayed on an electronic display device.

Figure 5:
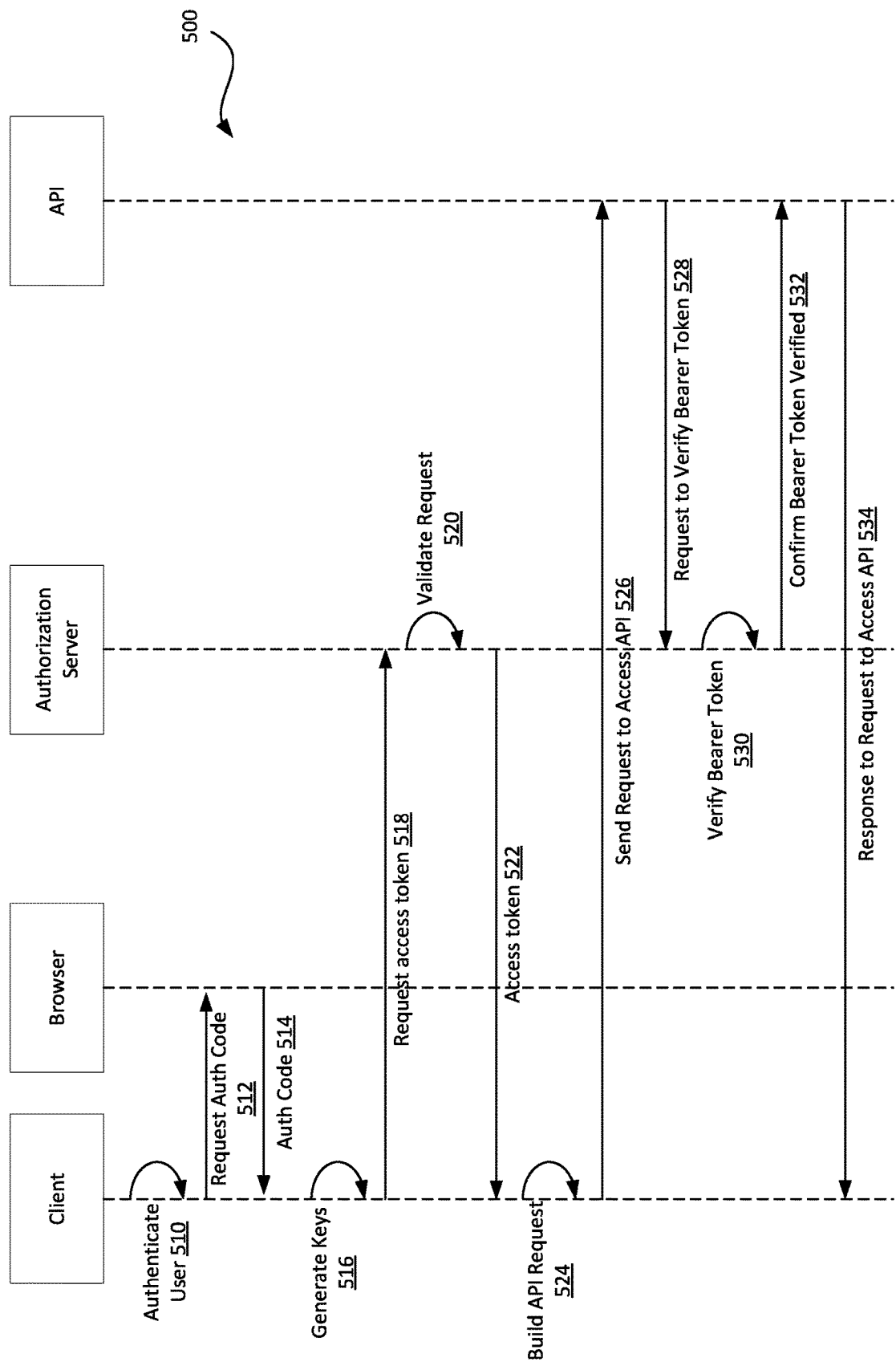
FIG. 5 is a sequence diagram showing an example process for regulating access to a protected resource by a client application.

Reference is now made to FIG. 5, which is a sequence diagram illustrating an example process 500 for client authentication and authorization for accessing a protected resource. The process 500 may be implemented as part of a protocol for authenticating a client application requesting to access a resource server and authorizing the client application to undertake an operation of a limited scope. In some example embodiments, as in the process illustrated in FIG. 5, a client application may be authorized to make an API request/call to cause an operation to be performed at a resource server.

When an end-user launches a client application on a device, the client application initiates authentication of the end-user in operation 510. In the context of an OpenID Connect implementation, the client application (or relying party) generates an OpenID authentication request (which may be an OAuth 2.0 authorization request to access the end-user's identity) via a browser (e.g. browser 320 of FIG. 3), in operation 512. The client application redirects the browser to the OAuth 2.0 authorization endpoint of an identity provider service (i.e. OpenID provider). That is, the user authentication takes place at the identity provider, where the user's credentials will be verified. For example, the end-user may be redirected to the identity provider service by a browser popup.

At the identity provider, the end-user will be authenticated by either checking that they have a valid active session or by prompting the end-user to log in using their user credentials. A valid session may be established by a session cookie. In the absence of a cookie, the end-user may be prompted to provide their credentials and consent for signing into the client application. The actual authentication of the end-user may be done in a number of different ways; in particular, the authentication technique is not limited to traditional username/password login.

Once the end-user is authenticated, the client application is provided with an authorization code in operation 514. In particular, the client application parses the redirect Uniform Resource Locator (URL) to obtain the authorization code. An authorization code is an intermediate credential, which encodes the authentication of the end-user and which may be exchanged for an access token. An access token is used to make authenticated requests to a protected resource, such as an API.

After receiving the authorization code, the client application may perform one or more intermediate operations, such as generating a unique identifier of the end-user. In operation 516, the client application may cause a pair of user-specific asymmetric cryptographic keys to be generated on the device. A public key and a private key are generated together. In at least some embodiments, the private key of the public-private key pair is generated in a hardware-based key manager, or a "secure enclave", on the user's device. The secure enclave is isolated from the main processor of the user's device to provide an extra layer of security. When the private key is stored in the secure enclave, the private key itself is not handled; instead, the secure enclave is instructed to create the key, securely store it, and perform operations with it. The client application only receives the output of said operations, such as encrypted data or a cryptographic signature verification outcome.

By specifying an access control object associated with the private key in the secure enclave, the key can be set to be only accessible on the device that created it and only when the device is unlocked. The access control object may include a flag for indicating that the private key should be available for use in signing and verification operations inside the secure enclave.

Once the keys have been generated, the client application submits a request to the authorization server, in operation 518, to obtain an access token for use in accessing a protected resource. For example, the client application may make a HTTP POST request to the authorization server. The access token may be used, for example, in making authenticated API calls to a resource server. As part of the request to the authorization server, the client application submits, at least: a client identifier uniquely identifying the client application, a user identifier uniquely identifying an end user of the client application, and the user-specific public key generated in operation 516.

In operation 520, the authorization server validates the request for an access token submitted by the client application. The authorization server may include, or be connected to, the mobile security service 132 of FIG. 1 and a security token service (included, for example, as a token endpoint of an identity provider). As part of the operation of validating the request, the authorization server may generate a request to exchange the authorization code for a set of one or more tokens, and submit the request to the security token service.

On success, the security token service (and, by association, the authorization server) returns a secure JavaScript Object Notation (JSON) Web Token (JWT) object with an ID token, an access token, and/or an optional refresh token. In some embodiments, the tokens may be saved at the authorization server. The end-user public key is also saved at the authorization server. The public key may be saved in association with the tokens (e.g. ID token, access token) which were generated as a result of the request submitted by the client application in operation 518.

In operation 522, the requested access token (and optionally, the refresh token) is provided to the client application. The access token may be saved on the user's device.

In operation 524, the client application constructs a request to access a protected resource. For example, the client application may generate a request/call to an API associated with a resource server. The client application may first create a cryptographic nonce. In some embodiments, the cryptographic nonce may include a combination of the client identifier, the user identifier, and a salt value (e.g. an arbitrary number to be used only once). A cryptographic signature is then created by the client application. The signature may be generated based on a message that includes a combination of a first representation of the requested access token and the cryptographic nonce. The message data (or a hash of the message data) may be encrypted with the user-specific private key in the secure enclave of the device. The signature itself may be generated in the secure enclave. The request to access the protected resource includes the access/bearer token, the cryptographic nonce, and the digital signature.

The client application sends the request to the protected resource, in operation 526. The protected resource, in turn, requests the authorization server to verify the bearer token submitted by the client application, in operation 528. That is, the authorization server receives, from a web server associated with the protected resource, a request to validate the bearer token.

In operation 530, the authorization server validates the bearer token. The digital signature may be verified by using the public key previously stored at the authorization server to decrypt the signature and comparing to the original data (i.e. the access token and cryptographic nonce). The cryptographic nonce may also be verified by the authorization server. In particular, the authorization server may compare the cryptographic nonce against a store of nonce values to ensure that the same value has not previously been used. The use of cryptographic nonce values can help to prevent token replay attacks, in which a client attempts to authenticate a relying party with a security token that the client has already used. By recording, in memory of the authorization server, a cryptographic nonce associated with an access token for the duration of the expiry period of said token, the authorization server may be able to detect token replay.

In response to validating the bearer token, the authorization server sends the web server associated with the protected resource a notification indicating that the bearer token is valid, in operation 532. For example, a message notifying the web server that the bearer token is valid may be generated and signed using a private key that is specific to the authorization server.

The web server receives the notification message (and/or the digital signature generated based on the message) from the authorization server and verifies it. If the message can be verified, the web server responds to the request (e.g. API call) of the client application to the protected resource, in operation 534.

Figure 6A:
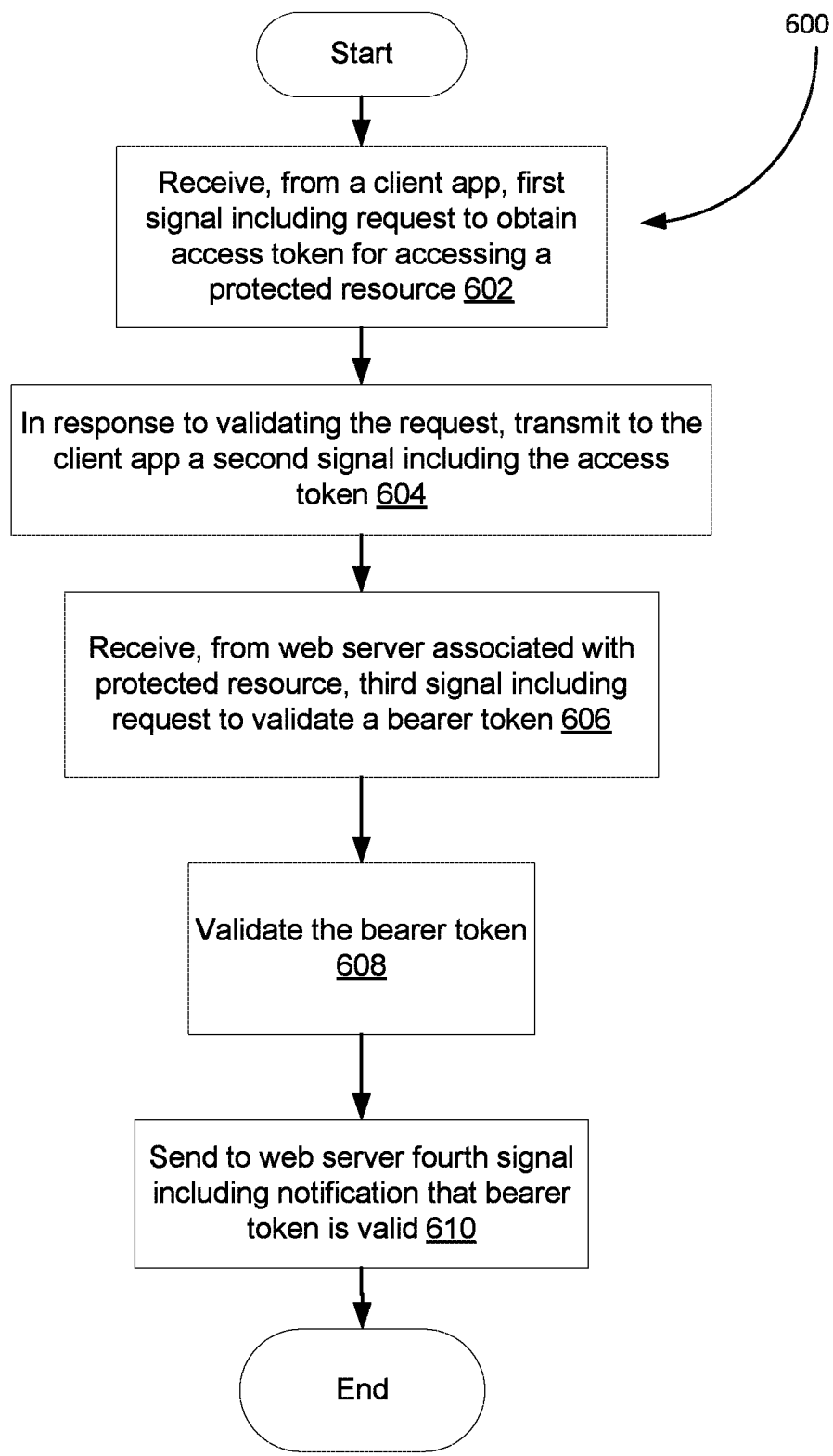
FIG. 6A shows, in flowchart form, an example method for regulating access to a protected resource.

Reference is made to FIG. 6A, which shows, in flowchart form, an example process 600 for regulating access to a protected resource. The process 600 may be performed by an authorization server, or at least a combination of a security token service and a server having a token endpoint and communicably coupled to both a requesting client application and an interface (e.g. web server, API, etc.) to a protected resource. The authorization server functions as an intermediary between the client application and the protected resource, facilitating authenticated requests by the client application to access the protected resource.

In operation 602, the server receives, from a client application, a first signal including a request to obtain an access token for accessing a protected resource, such as an API or database. The request includes a unique client identifier, a unique user identifier, and a public key associated with an end-user of the client application. The server validates the request, and transmits to the client application a second signal including a requested access token for accessing the protected resource, in operation 604.

The authorization server then provides validation of access permission granted to the client application. More specifically, in operation 606, the authorization server receives from the protected resource a third signal including a request to validate a bearer token submitted by the client application, where the bearer token includes a digital signature. The authorization server validates the bearer token in operation 608, verifying the digital signature using the public key included in the request in operation 602.

In response to validating the bearer token, the authorization server sends the protected resource a fourth signal indicating that the bearer token is indeed valid in operation 610.

Figure 6B:
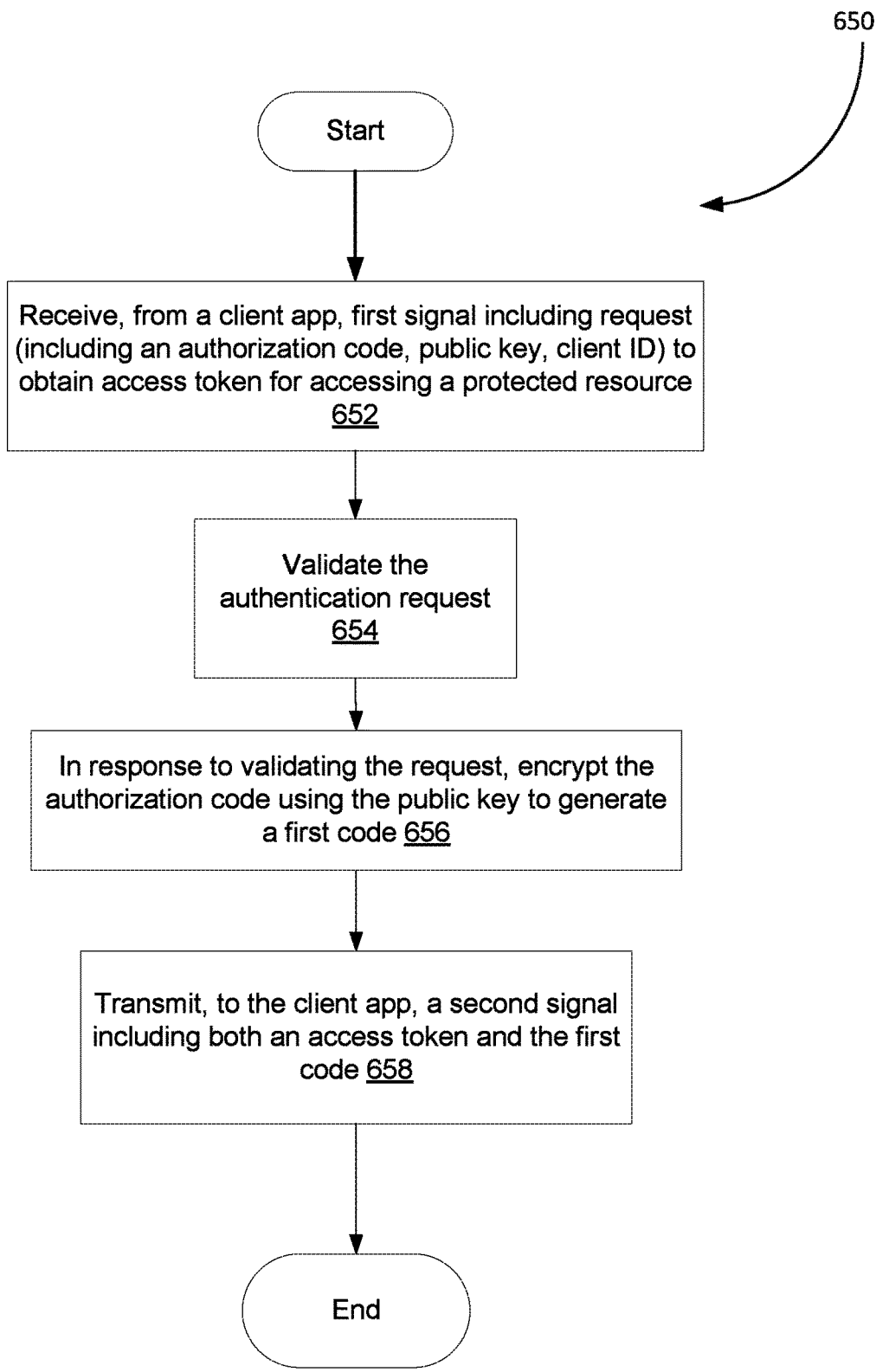
FIG. 6B shows, in flowchart form, another example method for regulating access to a protected resource.

Reference is made to FIG. 6B, which shows, in flowchart form, an example process 650 for regulating access to a protected resource. The process 650 may be performed by an authorization server, or at least a combination of a security token service and a server having a token endpoint and communicably coupled to both a requesting client application and an interface (e.g. web server, API, etc.) to a protected resource. The authorization server functions as an intermediary between the client application and the protected resource, facilitating authenticated requests by the client application to access the protected resource.

In operation 652, the server receives, from a client application, a first signal including a request to obtain an access token for accessing a protected resource, such as an API or database. The request includes, at least, a unique client identifier, an authorization code, and a public key associated with an end-user of the client application. The authorization code is the credential that the client application received when an end-user of the client application was authenticated. For example, the authorization code may be a credential that is provided in response to an authorization request in an OAuth 2.0 token-based security framework (e.g. using the OpenID Connect protocol).

In operation 654, the server validates the request. For example, the server may verify that at least one, or all, of the client identifier, authorization code, and public key in the authorization request corresponds to a valid application. If one or more of these is invalid, the server may reject the authorization request immediately. In response to validating the authorization request, the server encrypts the received authorization code using the public key associated with the end user to generate a first code, in operation 656. The first code, or the encrypted version of the authorization code from the client application, is then transmitted back to the client application, along with the access token assigned to the client application by the server, in operation 658.

The use of the public key associated with an end user of the client application for encrypting the authorization code may be useful for preventing an attack on the authentication process by a malicious actor. For example, if a malicious actor intercepted the authorization request from the client application to the authorization server, that actor may inject its own public key into the request, replacing the public key associated with the end user of the client application. In the absence of a security measure for dealing with such attacks, the server may generate an access token that is tied to the public key of the malicious actor.

The process 650 may help to avert such a security attack. With reference to FIG. 5, after validating the authorization request at 520, the server encrypts the authorization code with the public key provided by the client application, generating the first code, and transmits the first code back to the client application, along with the tokens in the response of operation 522 (i.e. access token, ID token, refresh token). The client application then decrypts the first code using its private key (of the public-private key pair generated at operation 516) and compares the result of the decryption with its authorization code. If there is a match, the access token received by the client application will be considered valid. If, however, there is no match (e.g. the code received by the client application is transmitted by the malicious actor), the client application may send a signal to the server indicating that the decryption failed to produce a match of the authorization code. In response to receiving said signal, the server may revoke, at least, the access token provided to the client application at a token revocation endpoint. In some embodiments, the server may revoke all tokens (including the refresh token) assigned to the client application upon receiving the third signal.

It should be noted that the server may encrypt, at operation 656, a value other than the authorization code transmitted by the client application. The authorization code may be preferred, however, as it is uniquely generated every time an end user logs in to the client application and generates an authorization request.

Figure 7:
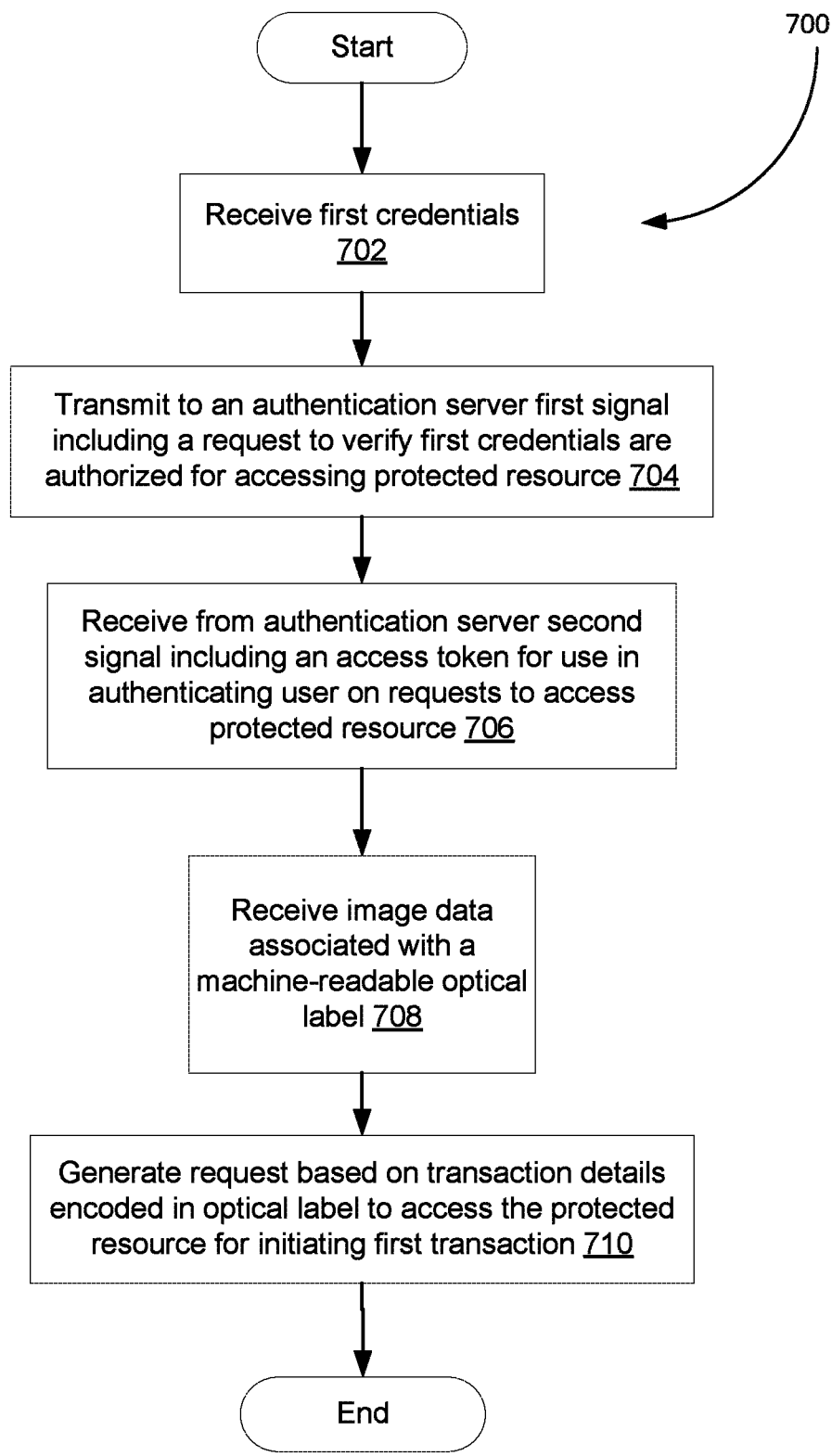
FIG. 7 shows, in flowchart form, an example method for a client application to gain access to a protected resource.

Reference is now made to FIG. 7, which shows an example method 700 for a client application on a user device to gain access to a protected resource. By way of example, the method 700 may be performed by a processor of a user device executing a client application, such as data transfer application 310, which is configured to make requests/calls to an API associated with a protected resource. For example, a third-party application may employ method 700 when using an open banking API that supports various banking-related applications and services.

The user device includes a memory, a camera module, a communications module, and a processor that is configured to implement all or parts of the method 700.

In operation 702, first credentials identifying a user are received on the device. For example, a user of a mobile device may input their user credentials on the device. The device then requests an authentication server to verify that the first credentials belong to a user that is authorized to access the protected resource, in operation 704. That is, the processor transmits to an authentication server, a first signal including a request to verify that the first credentials are authorized for accessing the protected resource. The first credentials may, for example, be compared to and validated against a database of identifies of authorized users/entities.

When the first credentials are determined to be authorized for accessing the protected resource, the device receives from the authentication server a second signal that includes an access token for use in authenticating the user on requests to access the protected resource, in operation 706. For example, the access token may be an OAuth token that can interact with one or more APIs interfacing with the protected resource. The token may, in some embodiments, be saved on the user's device upon receipt.

The user of the device can then provide one or more inputs specifying details of operations which may be performed at the protected resource. More specifically, user input to the device may indicate transaction details which may be initiated by accessing the protected resource (or an interface, such as an API, associated therewith). An API associated with a protected resource may include instructions for initiating transfer of data from a first account to a second account at the protected resource, such as a resource server.

An example instance of digital identity management and authorization arises in the context of data transfers between accounts at a protected resource server. A client application may make an API request to a resource server to effect a transfer of data between two or more different accounts. In some cases, the data contained in the accounts and/or the identities of the accounts may be sensitive information which may be prone to appropriation by attackers. Accordingly, when processing such API requests, it is desirable to remove or anonymize account-identifying information in communications between a requesting client application and the resource server.

In operation 708, the device receives, from the camera module, image data associated with a machine-readable optical label. For example, the user of the device may capture image data of a machine-readable optical label that is printed or displayed on a medium different from the device (e.g. physical printed material, a label displayed on an electronic display device, etc.). The optical label encodes transaction details of a first transaction which may be completed upon gaining access to the protected resource. The device, or a mobile application executing on the device, may decode the information encoded in the machine-readable optical label and extract the transaction details of the first transaction.

In at least some embodiments, the transaction details include a unique identifier of the first transaction. By using unique transaction identifiers, replay attacks or accidental double transfers of data may be prevented. The transaction details do not, however, identify the accounts that are involved in the first transaction. That is, for a transfer transaction between a first account and a second account, the transaction details obtained from the image data do not indicate the identities of the first and second accounts. The machine-readable optical label may, in some instances, be a two-dimensional barcode that encodes the transaction details of the first transaction (e.g. "Quick Response (QR) Code"). The machine-readable optical label may have an expiry time, after which the label will no longer provide transaction details of the first transaction.

In operation 710, the device generates a request based on the transaction details to access the protected resource for initiating the first transaction, where the request includes the access token received from the authentication server. In some embodiments, the request to access the protected resource may be generated only upon the device receiving a user input providing authorization to initiate the first transaction. The request may also include the type and quantity of data to be transferred in the first transaction.

Figure 8:
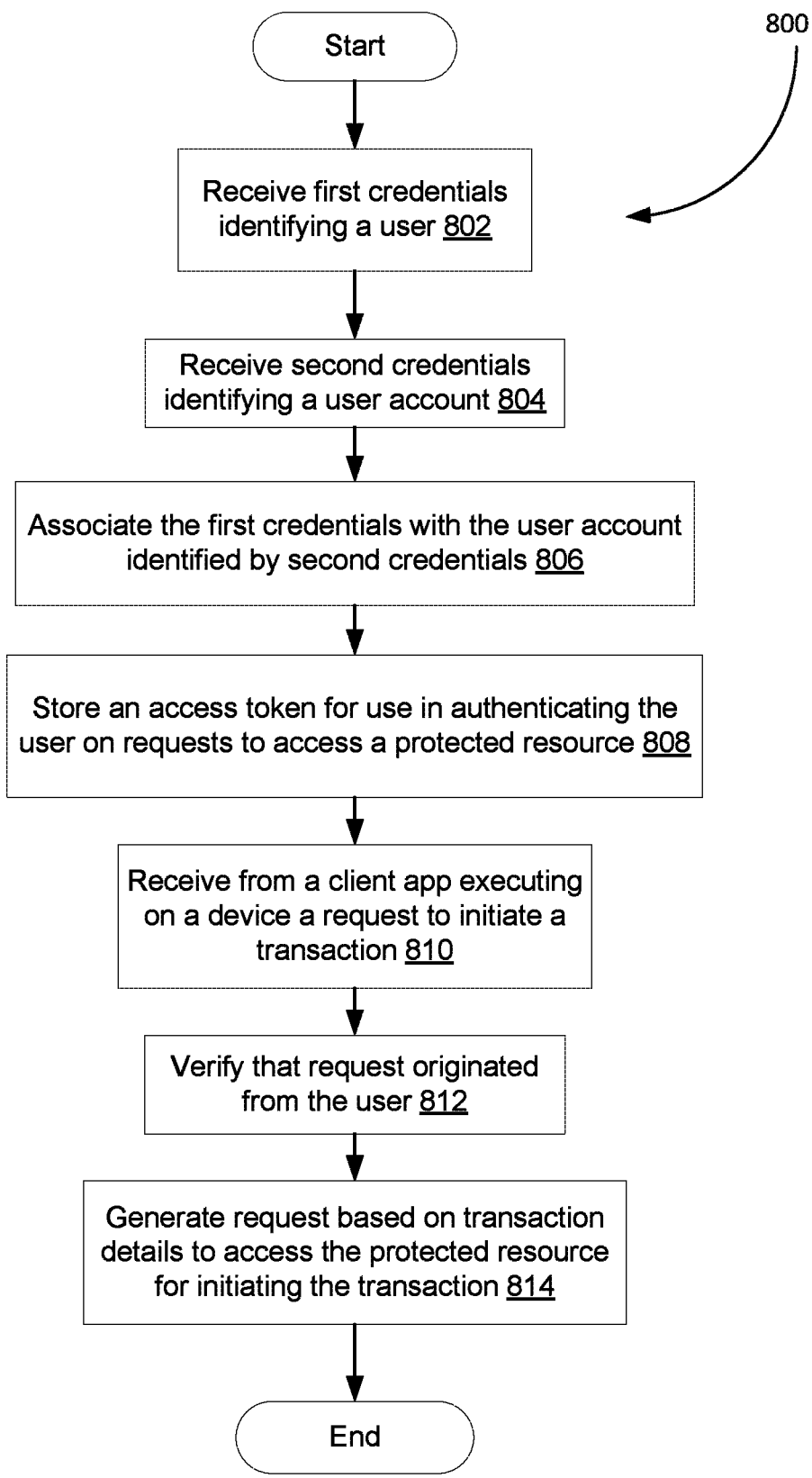
FIG. 8 shows, in flowchart form, an example method for regulating access to a protected resource server for requesting transfer of data between accounts at the resource server.

Reference is now made to FIG. 8, which shows, in flowchart form, an example method 800 for regulating access to a protected resource server for requesting transfer of data between accounts at the resource server. The method 800 may be implemented by an authentication/authorization server that is communicably coupled to a client application requesting access to a protected resource. The authentication/authorization server may serve as an intermediary between the client application and the protected resource.

In operation 802, the server receives first credentials identifying a user. The first credentials may, for example, be employee credentials identifying a specific employee within an organization. The first credentials may be received when the user inputs the credentials on the device in a log-in prompt.

In operation 804, the server receives second credentials identifying a user account. The user account may be an account at the protected resource, or an account that is at least accessible by an interface (e.g. API) to the protected resource. The second credentials may be input by the user who used the first credentials to log in to the first authentication layer (e.g. employee authentication system). The user account information identified by the second credentials is then associated with the first credentials (e.g. employee identifier), in operation 806.

The server then stores, in memory, an access token for use in authenticating the user on requests to access the protected resource, in operation 808. For example, the server may receive the access token from a different entity, such as the protected resource or another authorization server interfacing with the protected resource, or generate the access token by itself.

In operation 810, the server receives, from a client application executing on the user device, a request to initiate a first transaction, where the request includes transaction details derived from a machine-readable optical label.

The server then verifies that the request originated from the user, in operation 812. In some embodiments, the server may verify that the user credentials received from the client application match the first credentials.

In operation 814, in response to verifying that the request originated from the authorized user, the server generates a request based on the transaction details to access the protected resource for initiating the first transaction. The request includes, at least, the access token obtained in operation 808.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A network device, comprising:
a communication interface connected to an external network;
a memory;
a processing unit coupled to the communication interface and the memory, the processing unit being configured to:
receive, via the communication interface from a client application executing on a first device, a first signal including a request to obtain an access token for accessing a protected resource, the request including:
a client identifier uniquely identifying the client application;
an authorization code for authorizing the client application's access of the protected resource; and
a public key associated with an end user;
validate the request to obtain the access token; and
in response to validating the request:
encrypt the authorization code using the public key to generate a first code; and transmit, via the communication interface to the client application on the first device, a second signal including both the access token for accessing the protected resource and the first code.

2. The network device of claim 1, wherein the authorization code is a unique code encoding authentication of an end user of the client application.

3. The network device of claim 1, wherein the processing unit is further configured to:
decrypt the first code;
receive, via the communication interface from the client application, a third signal including an indication that decrypting the first code failed to produce a match of the authorization code; and
in response to receiving the third signal, revoking the access token at a token revocation endpoint of the network device.

4. The network device of claim 1, wherein the processing unit is further configured to:
receive, via the communication interface from a web server associated with the protected resource, a fourth signal including a request to validate a bearer token submitted by the client application to the web server, the bearer token including a digital signature;
validate the bearer token, the validating including verifying the digital signature using the public key; and
in response to validating the bearer token, send to the web server via the communication interface a fifth signal including a notification that the bearer token is valid.

5. The network device of claim 4, wherein the bearer token includes a cryptographic nonce.

6. The network device of claim 4, wherein the digital signature is generated based on a message that includes a combination of a first representation of the access token and a cryptographic nonce.

7. The network device of claim 6, wherein the digital signature is generated using a private key corresponding to the public key, the private key being stored in a hardware-based key manager that is isolated from the processing unit.

8. The network device of claim 7, wherein the digital signature is generated in the hardware-based key manager.

9. The network device of claim 4, wherein sending the fifth signal to the web server comprises generating a message and signing the generated message using a first private key.

10. The network device of claim 1, wherein the access token has an associated expiry period and wherein the processing unit is further configured to store a cryptographic nonce in the memory for duration of the expiry period of the access token.

11. A method comprising:
receiving, via a communication interface from a client application executing on a first device, a first signal including a request to obtain an access token for accessing a protected resource, the request including:
a client identifier uniquely identifying the client application;
an authorization code for authorizing the client application's access of the protected resource; and
a public key associated with an end user;
validating the request to obtain the access token; and
in response to validating the request:
encrypting the authorization code using the public key to generate a first code; and
transmitting, via the communication interface to the client application on the first device, a second signal including both the access token for accessing the protected resource and the first code.

12. The method of claim 11, wherein the authorization code is a unique code encoding authentication of an end user of the client application.

13. The method of claim 11, further comprising:
decrypting the first code;
receiving, via the communication interface from the client application, a third signal including an indication that decrypting the first code failed to produce a match of the authorization code; and
in response to receiving the third signal, revoking the access token at a token revocation endpoint of a network device.

14. The method of claim 11, further comprising:
receiving, from a web server associated with the protected resource, a third signal including a request to validate a bearer token submitted by the client application to the web server, the bearer token including a digital signature;
validating the bearer token, the validating including verifying the digital signature using the public key; and
in response to validating the bearer token, sending to the web server a fourth signal including a notification that the bearer token is valid.

15. The method of claim 14, wherein the bearer token includes a cryptographic nonce.

16. The method of claim 14, wherein the digital signature is generated based on a message that includes a combination of a first representation of the access token and a cryptographic nonce.

17. The method of claim 16, wherein the digital signature is generated using a private key corresponding to the public key, the private key being stored in a hardware-based key manager.

18. The method of claim 17, wherein the digital signature is generated in the hardware-based key manager.

19. The method of claim 14, wherein sending the fifth signal to the web server comprises generating a message and signing the generated message using a first private key.

20. The method of claim 11, wherein the access token has an associated expiry period and wherein the method further comprises storing a cryptographic nonce in a memory for duration of the expiry period of the access token.

* * * * *